United States Patent
Tanaka

(10) Patent No.: US 11,929,661 B2
(45) Date of Patent: Mar. 12, 2024

(54) IN-VEHICLE POWER SUPPLY DEVICE

(71) Applicant: Panasonic Intellectual Property Management Co., Ltd., Osaka (JP)

(72) Inventor: Hideki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 178 days.

(21) Appl. No.: 17/428,308

(22) PCT Filed: Mar. 30, 2020

(86) PCT No.: PCT/JP2020/014469
§ 371 (c)(1),
(2) Date: Aug. 4, 2021

(87) PCT Pub. No.: WO2020/203949
PCT Pub. Date: Oct. 8, 2020

(65) Prior Publication Data
US 2022/0153213 A1 May 19, 2022

(30) Foreign Application Priority Data
Apr. 2, 2019 (JP) ................................. 2019-070315

(51) Int. Cl.
*H02M 1/00* (2006.01)
*B60R 16/033* (2006.01)
*H02J 7/00* (2006.01)

(52) U.S. Cl.
CPC ......... *H02M 1/0032* (2021.05); *B60R 16/033* (2013.01); *H02J 7/0063* (2013.01); *H02M 1/0009* (2021.05); *H02J 2207/20* (2020.01)

(58) Field of Classification Search
CPC . H02M 1/0032; H02M 1/0009; B60R 16/033; H02J 7/0063; H02J 2207/20
(Continued)

(56) References Cited

U.S. PATENT DOCUMENTS

2008/0150483 A1* 6/2008 Morita .................... H02J 9/061
320/122
2016/0061171 A1* 3/2016 Frye ........................ F02N 19/00
307/10.6
(Continued)

FOREIGN PATENT DOCUMENTS

CN 206894499 U 1/2018
JP 9-289707 11/1997
(Continued)

OTHER PUBLICATIONS

International Search Report of PCT application No. PCT/JP2020/014469 dated Jun. 9, 2020.
(Continued)

*Primary Examiner* — Alfonso Perez Borroto
(74) *Attorney, Agent, or Firm* — WHDA, LLP

(57) ABSTRACT

An in-vehicle power supply device includes an input end configured to be connected to an in-vehicle secondary battery, an output end configured to be connected to an in-vehicle load, an external signal input port configured to receive an activation signal, a first converter unit connected to the input end and the output end, and a second converter unit connected in parallel to the first converter unit. The first converter unit includes a first drive power supply configured to constantly receive power suppled from the input end, and a first voltage converter operable in response to the power received by the first drive power supply to constantly output power from the output end. The second converter unit includes a second drive power supply activated by the activation signal received by the external signal input port, a converter controller configured to start to operate in response to the activating of the second drive power supply, and a second voltage converter configured to start to operate in response to the starting of the operating of the converter
(Continued)

controller so as to output power from the output end. The in-vehicle power supply device increases power efficiency.

7 Claims, 3 Drawing Sheets

(58) Field of Classification Search
USPC .......................................................... 307/9.1
See application file for complete search history.

(56) References Cited

U.S. PATENT DOCUMENTS

| | | | | |
|---|---|---|---|---|
| 2017/0149332 A1* | 5/2017 | Tanigawa | ................ | E05B 81/56 |
| 2019/0023202 A1* | 1/2019 | Bantiles | ................ | B60R 16/023 |

FOREIGN PATENT DOCUMENTS

| | | |
|---|---|---|
| JP | H11-312591 A | 11/1999 |
| JP | 2000-299977 A | 10/2000 |
| JP | 2018-093633 A | 6/2018 |

OTHER PUBLICATIONS

English translation of Search Report dated Dec. 25, 2023,, issued in counterpart CN Application No. 202080024524.8. (3 pages).

\* cited by examiner

US 11,929,661 B2

IN-VEHICLE POWER SUPPLY DEVICE

CROSS-REFERENCE TO RELATED APPLICATIONS

This application is a U.S. national stage application of the PCT international application No. PCT/JP2020/014469 filed on Mar. 30, 2020, which claims the benefit of foreign priority of Japanese patent application No. 2019-070315 filed on Apr. 2, 2019, the contents all of which are incorporated herein by reference

TECHNICAL FIELD

The present invention relates to an in-vehicle power supply device configured to be mounted to various vehicles.

BACKGROUND ART

FIG. 3 is a circuit block diagram of conventional in-vehicle power supply device 1. In-vehicle power supply device 1 mounted to vehicle 2 includes converter 3 and converter 4. In-vehicle power supply device 1 is configured to convert power supplied from power generator 5 or secondary battery 6 into a predetermined voltage, and supply the converted power to load 7.

In-vehicle power supply device 1 drives either converter 3 or converter 4 to supply power to load 7 in a first power supplying state. In a second power supplying state in which a larger power than that of the first power supplying state is needed, both converter 3 and converter 4 are turned into a drive state to supply the power to load 7. In-vehicle power supply device 1 thereby supplies power with a stable voltage to load 7 from power generator 5 or secondary battery 6. In-vehicle power supply device 1 may deteriorate in power efficiency of entire vehicle 2.

A conventional in-vehicle power supply device similar to in-vehicle power supply device 1 is disclosed in, e.g. PTL 1.

CITATION LIST

Patent Literature

PTL 1: Japanese Patent Laid-Open Publication No. 09-289707

SUMMARY

An in-vehicle power supply device includes an input end configured to be connected to an in-vehicle secondary battery, an output end configured to be connected to an in-vehicle load, an external signal input port configured to receive an activation signal, a first converter unit connected to the input end and the output end, and a second converter unit connected in parallel to the first converter unit. The first converter unit includes a first drive power supply configured to constantly receive power suppled from the input end, and a first voltage converter operable in response to the power received by the first drive power supply to constantly output power from the output end. The second converter unit includes a second drive power supply activated by the activation signal received by the external signal input port, a converter controller configured to start to operate in response to the activating of the second drive power supply, and a second voltage converter configured to start to operate in response to the starting of the operating of the converter controller so as to output power from the output end. The in-vehicle power supply device increases power efficiency.

DETAIL DESCRIPTION OF PREFERRED EMBODIMENT

Figure 1:
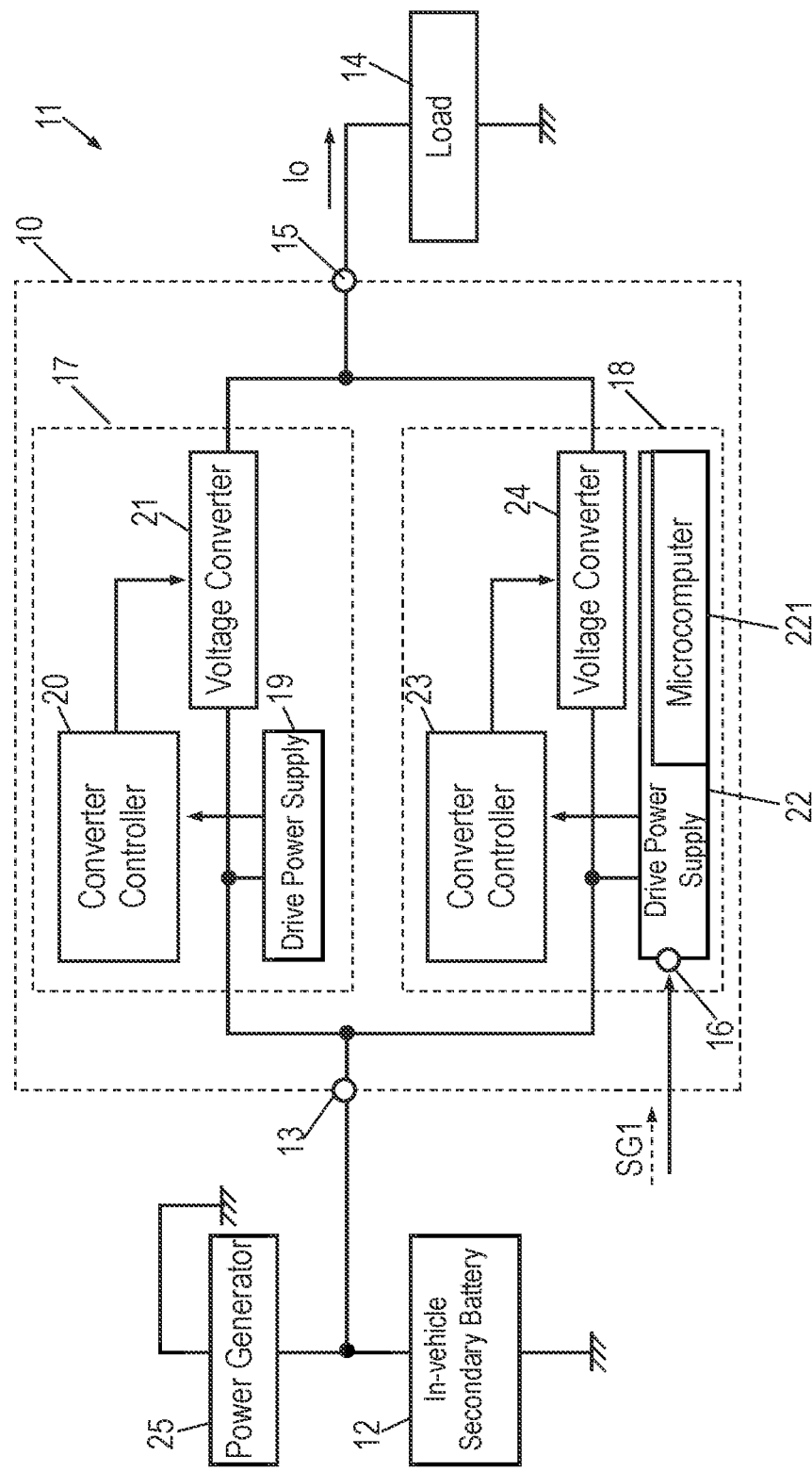
FIG. 1 is a circuit block diagram of an in-vehicle power supply device in accordance with an exemplary embodiment.

FIG. 1 is a circuit block diagram of an in-vehicle power supply device in accordance with an exemplary embodiment. In-vehicle power supply device 10 is configured to be mounted to vehicle 11 including in-vehicle secondary battery 12 and in-vehicle load 14. In-vehicle power supply device 10 includes input end 13 configured to be connected to in-vehicle secondary battery 12, output end 15 configured to be connected to in-vehicle load 14, external signal input port 16 configured to receive activation signal SG1, and converter units 17 and 18.

Converter unit 17 is connected to input end 13 and output end 15. Converter unit 17 includes drive power supply 19, converter controller 20, and voltage converter 21. Voltage converter 21 is driven by drive power supply 19 and converter controller 20.

Converter unit 18 is connected to input end 13 and output end 15 such that converter unit 18 is connected in parallel to converter unit 17. Converter unit 18 includes drive power supply 22, converter controller 23, and voltage converter 24. Drive power supply 22 is connected to external signal input port 16.

Drive power supply 19 receives power supply from input end 13 constantly even during a period of time when vehicle 11 does not start, so that voltage converter 21 may be standby or operate constantly. Converter unit 17 is thus constantly operable to output power.

In converter unit 18, upon being activated in response to activation signal SG1 received by external signal input port 16, drive power supply 22 start converter controller 23 and voltage converter 24 to operate to allow converter 24, i.e., converter unit 18 to output power.

The above configuration and operation cause converter unit 17 to consume power constantly, whereas converter unit 18 does not operate until receiving a start instruction as activation signal SG1. Upon receiving the start instruction, converter unit 18 starts to operate and consume power. Converter unit 18 does not thus constantly consume power, i.e., converter unit 18 does not consume the power of in-vehicle secondary battery 12 connected to input end 13 until receiving the start instruction. This configuration prevents a drop in voltage of in-vehicle secondary battery 12 or activation of power generator 25 resulting from the drop in voltage of in-vehicle secondary battery 12, consequently preventing deterioration in power efficiency of entire vehicle 11.

Figure 3:
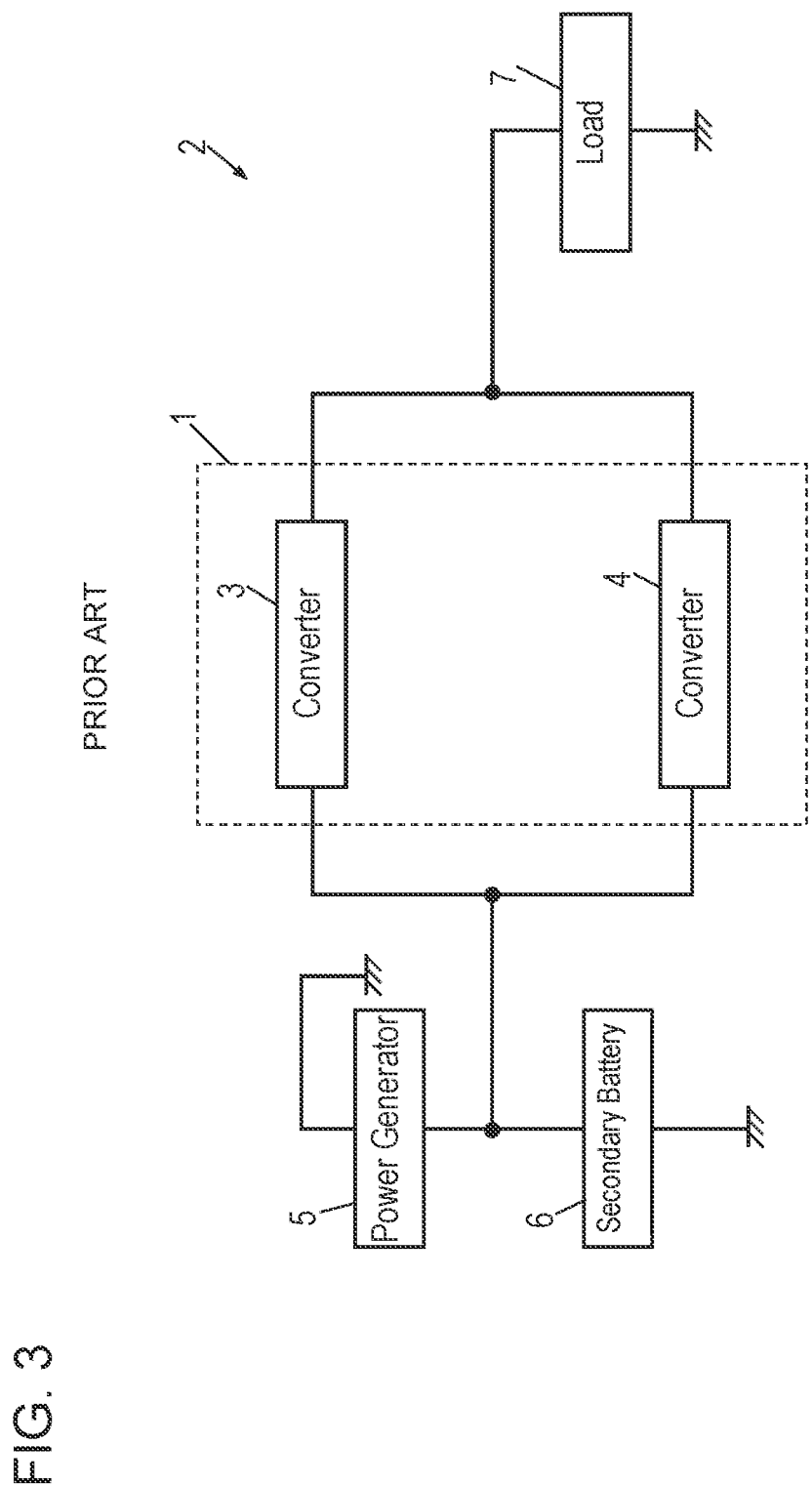
FIG. 3 is a circuit block diagram of a conventional in-vehicle power supply device.

In conventional in-vehicle power supply device 1 shown in FIG. 3, one of converters 3 and 4 is constantly driven while the other converter is standby even when being not driven and outputting no power. Therefore, the other converter continuously consume standby power even when being not driven. As a result, in-vehicle power supply device 1 may cause a drop in voltage of secondary battery 6, which occurs when power generator 5 is not operated, or may deteriorate power efficiency of entire vehicle 2 due to activating of power generator 5 frequently.

On the other hand, in-vehicle power supply device 10 in accordance with the embodiment prevents deterioration in power efficiency of entire vehicle 11 as mentioned above.

Figure 2:
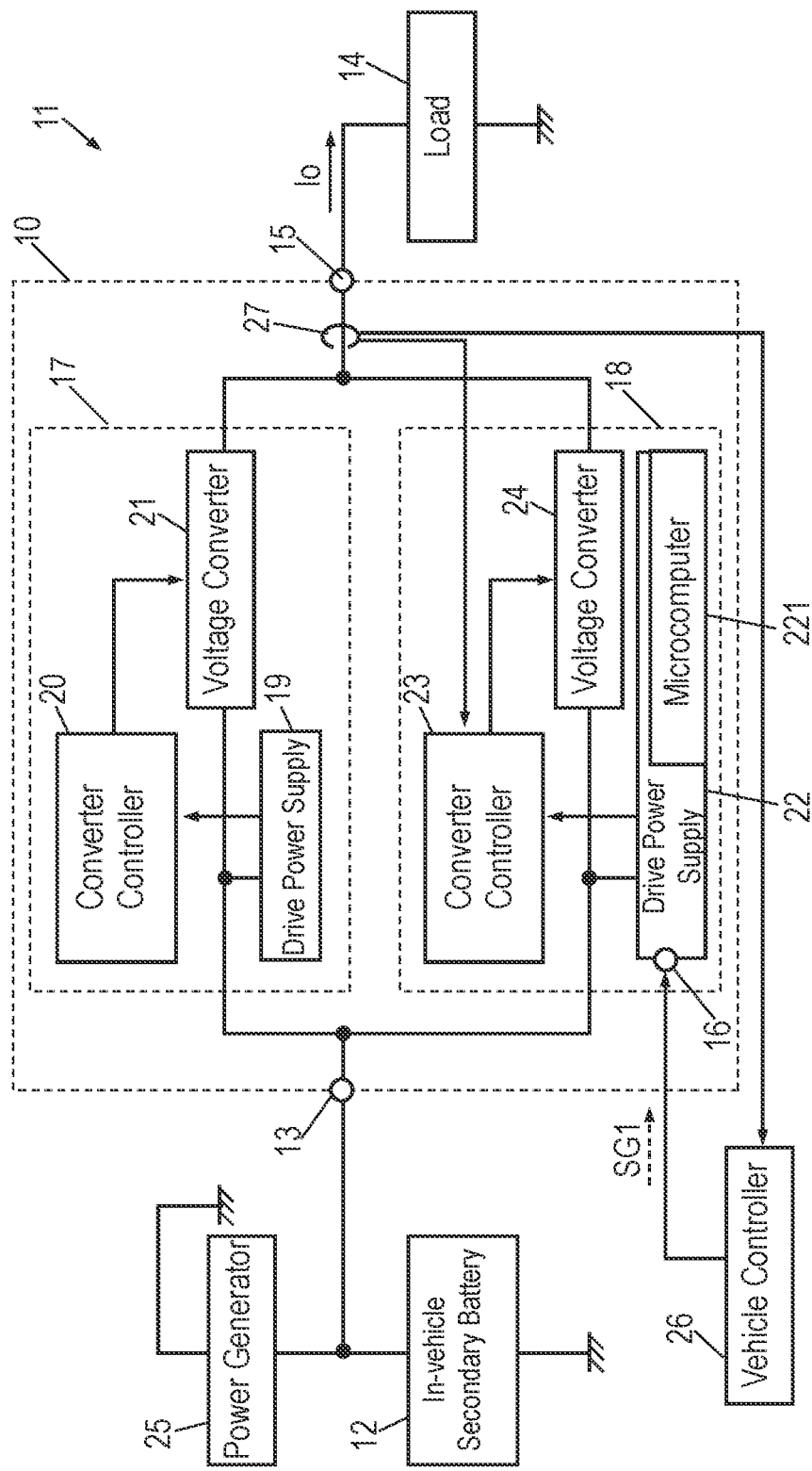
FIG. 2 is another circuit block diagram of the in-vehicle power supply device in accordance with the embodiment.

In-vehicle power supply device 10 will be detailed below. FIG. 2 is another circuit block diagram of in-vehicle power supply device 10. Input end 13 is connected to power generator 25 and in-vehicle secondary battery 12. Power generator 25 includes an electric circuit, such as a rectifier, converting an alternating-current (AC) voltage generated into a direct-current (DC) voltage to be input to input end 13.

Vehicle 11 includes vehicle controller 26. Activation signal SG1 is supplied in response to a predetermined operation performed by an occupant, such as a driver or passenger, of the vehicle. For instance, activation signal SG1 is a vehicle start signal that is supplied from vehicle controller 26 in response to the turning on of a vehicle start switch performed by the driver to start vehicle 11. Alternatively, activation signal SG1 is supplied from vehicle controller 26 in synchronization with the vehicle start signal that is issued in response to the turning on of the vehicle start switch performed by the driver. Alternatively, activation signal SG1 is supplied from vehicle controller 26 in conjunction with the vehicle start signal that is issued in response to the turning on of the vehicle start switch performed by the driver. After that, activation signal SG1 may continuously be supplied to drive power supply 22 from vehicle controller 26 until the driver turns off the vehicle start switch.

Converter unit 17 is connected to input end 13 and output end 15. Converter unit 17 includes drive power supply 19, converter controller 20, and voltage converter 21. Voltage converter 21 is driven by drive power supply 19 and converter controller 20. Voltage converter 21 is constantly standby to be operable to output power. In other words, the entirety of converter unit 17 is standby, i.e., converter unit 17 is constantly operable to supply power to in-vehicle load 14. Alternatively, in response to the turning on of a switch provided in in-vehicle load 14 while converter unit 17 constantly supply voltage to output end 15, converter unit 17 starts to supply power to in-vehicle load 14 at that moment of the turning on of the switch.

In converter unit 17, at least drive power supply 19 configured to activate converter controller 20 constantly consumes the power supplied from input end 13. This state is a state where a driver does not turn on the vehicle start switch. In other words, even if vehicle 11 does not start, converter unit 17 consumes the power of in-vehicle secondary battery 12 although it is very small.

Converter unit 18 is connected to input end 13 and output end 15 in parallel to converter unit 17. Converter unit 18 includes drive power supply 22, converter controller 23, and voltage converter 24. Drive power supply 22 is connected to external signal input port 16. Converter unit 18 is in a deactivated state in which converter unit 18 does not operate when receiving no activation signal SG1. While converter unit 18 is in the deactivated state, drive power supply 22, converter controller 23, and voltage converter 24 all are stopped, thereby consuming no power.

In other words, converter unit 18 is not constantly operable to supply power to in-vehicle load 14. In other words, converter unit 18 is not necessarily always operable to supply power to in-vehicle load 14. During receiving activation signal SG1, converter unit 18 operates. Alternatively, converter unit 18 starts to operate to start to supply power in-vehicle load 14 in response to the turning on of the switch of in-vehicle load 14 while converter unit 18 constantly supply a voltage to output end 15 during a period when receiving activation signal SG1.

In converter unit 18, when external signal input port 16 receives activation signal SG1, drive power supply 22 is activated. Thus, converter controller 23 and voltage converter 24 start to operate to output power to in-vehicle load 14 via output end 15. Accordingly, converter unit 18 starts to consume power from the time when activation signal SG1 is supplied to drive power supply 22 from vehicle controller 26. When activation signal SG1 is not supplied to drive power supply 22 from vehicle controller 26, converter unit 18 consumes no power.

Converter unit 17 consumes power constantly, whereas converter unit 18 does not operate until receiving the start instruction. When receiving the start instruction, converter unit 18 starts to operate and consume power. Accordingly, converter unit 18 does not constantly consume power, i.e., converter unit 18 does not consume the power of in-vehicle secondary battery 12 connected to input end 13 until receiving the start instruction. This configuration prevents a drop in voltage of in-vehicle secondary battery 12 or activation of a power generator (not shown) resulting from the drop in voltage of in-vehicle secondary battery 12, thereby preventing deterioration in power efficiency of entire vehicle 11.

Converter unit 17 may preferably have power capacity smaller than power capacity of converter unit 18. This configuration reduces power consumption of drive power supply 19 especially in the standby state of drive power supply 19 among drive power supply 19, converter controller 20, and voltage converter 21 of converter unit 17 being constantly standby to be operable to output power.

In the case that that activation signal SG1 is supplied from vehicle controller 26 in response to the turning on of the vehicle start switch performed by the driver, none of drive power supply 22, converter controllers 23, and voltage converter 24 all operate, and consume power before activation signal SG1 is supplied from vehicle controller 26. Therefore, in order to activate drive power supply 22 readily in response to the receiving of activation signal SG1, microcomputer 221 or the like is provided in drive power supply 22 so as to allow drive power supply 22 to be activated in a boot mode in response to the reception of activation signal SG1. In this case, microcomputer 221 activates drive power supply 22. Thus, when receiving no activation signal SG1, converter unit 18 is readily be turned into the deactivated state in which converter unit 18 consumes no power.

Converter controller 23 and voltage converter 24 of converter unit 18 starts to operate in response to the activating of drive power supply 22 in response to activation signal SG1 received by external signal input port 16. At this moment, converter controller 23 may preferably start to detect output current Io flowing through output end 15. Output current Io supplied to in-vehicle load 14 is detected by current sensor 27 provided at output end 15. Converter controller 23 controls an operation of voltage converter 24 based on output current Io detected by current sensor 27 so as to cause converter unit 18 to output power.

Converter unit 17 is operable to output power constantly. Converter unit 17 starts to operate before converter unit 18. Converter unit 18 starts to output power while being delayed from activation signal SG1 by a time lag after external signal input port 16 receives activation signal SG1. After converter unit 18 starts to operate, converter units 17 and 18 may share the output based on output current Io detected by converter controller 23.

When current Io at output end 15 is smaller than a first current threshold, only converter unit 17 out of converter units 17 and 18 supplies power while converter unit 18 does not operate, i.e., supplies no power. When current Io at output end 15 is more than or equal to the first current threshold and smaller than a second current threshold, only converter unit 18 out of converter units 17 and 18 supplies power while converter unit 17 supplies no power. When current Io at output end 15 is more than the second current threshold, both of converter units 17 and 18 supply power.

When converter unit 18 supplies no power, it drive power supply 22 and converter controller 23 preferably operate and only voltage converter 24 of converter unit 18 is stopped. This configuration allows converter unit 18 to supply power promptly if required to output the power. The power consumption caused by operation of voltage converter 24 can be reduced. This operation reduces power to be supplied from in in-vehicle secondary battery 12 and power generator 25, thereby improving power efficiency of entire vehicle 11.

Current Io detected at output end 15 functions as a trigger to change the operating state of converter unit 18. However, vehicle controller 26 may change the operating state of converter unit 18 at a time point when a lack of power capacity of converter unit 17, i.e., a change in the current, which is caused by a predetermined operation performed by a vehicle occupant, is predicted by vehicle controller 26, especially when an increase in current Io at output end 15 is predicted.

In the above description, an operation mode in which converter unit 18 outputs power or converter unit 18 is turned to be operable to output power in response to activation signal SG1 supplied from vehicle controller 26 by the turning on of the vehicle start switch performed by a driver. The timing at which activation signal SG1 is supplied from vehicle controller 26 may be the time when, after vehicle 11 has already been started by a driver, a lack of power capacity of converter unit 17 is caused by the predetermined operation, which is performed by an occupant of the vehicle.

For instance, converter unit 17, which can output power constantly, may start to operate before converter unit 18. After vehicle 11 is started and after external signal input port 16 receives activation signal SG1, converter unit 18 may start to output power while being delayed from activation signal SG1 by a time lag. Thus, even after vehicle 11 has been started, drive power supply 22, converter controller 23, and voltage converter 24 all are stopped until a large power is required, i.e., converter unit 18 can remain in the deactivated state in which power is not consumed at all.

The timing at which vehicle controller 26 supplies activation signal SG1 may be determined based on current Io detected by vehicle controller 26 with current sensor 27. After converter unit 18 is activated in response to activation signal SG1 received at external signal input port 16, converter controller 23 starts to detect output current Io at output end 15. Then, converter controller 23 controls the operation of voltage converter 24 based on current Io detected by current sensor 27, and causes converter unit 18 to output power.

In vehicle 11 that has already been started, vehicle controller 26 detects current Io at output end 15, and current Io functions as a trigger to change converter unit 18 from the deactivated state to the operating state. However, activation signal SG1 may be supplied from vehicle controller 26 in response to a predetermined operation performed by an occupant of the vehicle while power capacity of converter unit 17 runs short. Alternatively, vehicle controller 26 may supply activation signal SG1 at a time point when a change in the current, which is caused by a predetermined operation performed by an occupant of the vehicle, is predicted, especially when an increase in current Io at output end 15 is predicted, thereby changing converter unit 18 from the deactivated state to the operating state. This configuration decreases a time lag from the time when a lack of power capacity of converter unit 17 is caused to the time when converter unit 18 is activated.

Alternatively, vehicle controller 26 may supply activation signal SG1 in response to an operation performed by an occupant of the vehicle to cause a subsequent increase in output power of converter unit 17, thereby changing converter unit 18 from the deactivated state to the operating state. This configuration decreases a time lag raging from the time when a lack of power capacity of converter unit 17 is caused to the time when converter unit 18 is activated.

Alternatively, for instance, in the case where in-vehicle load 14 is a lead secondary battery with a voltage lower than that of in-vehicle secondary battery 12, the timing at which vehicle controller 26 supplies activation signal SG1 may be the time when the voltage of the lead secondary battery, serving as in-vehicle load 14, decreases to be lower than a predetermined voltage. This configuration decreases a time lag ranging from the time when a lack of power capacity of converter unit 17 is caused to the time when converter unit 18 is activated. Vehicle controller 26 detects the voltage at output end 15, thereby detecting the voltage of in-vehicle load 14, the lead secondary battery.

In the above-mentioned description of the exemplary embodiment, drive power supply 19 and converter controller 20 of converter unit 17 are described as elements each being provided individually. However, single drive power supply 19 may be provided as an element having both functions of drive power supply 19 and converter controller 20. Similarly, drive power supply 22 and the converter controller 23 of converter unit 18 are described as elements each being provided individually. However, single drive power supply 22 may be provided as an element having both functions of drive power supply 22 and converter controller 23.

Further, in in-vehicle power supply device 10 of the above-mentioned exemplary embodiment, two converter units 17 and 18 are connected in parallel to each other. In in-vehicle power supply device 10, three or more converter units may be connected in parallel to one another. In the case that three or more converter units are connected in parallel, two or more converter units may be in a standby state, or two or more converter units may be in a deactivated state. The number of converter units to be in the standby state or in the deactivated state is preferably determined depending on, e.g. characteristics of in-vehicle load 14.

REFERENCE MARKS IN THE DRAWINGS 10 in-vehicle power supply device
11 vehicle
12 in-vehicle secondary battery
13 input end
14 in-vehicle load
15 output unit
16 external signal input port
17 converter unit (first converter unit)
18 converter unit (second converter unit)
19 drive power supply (first drive power supply)
20 converter controller 21 voltage converter (first voltage converter)
22 drive power supply (second drive power supply)
23 converter controller
24 voltage converter (second voltage converter)
25 power generator
26 vehicle controller
27 current sensor

The invention claimed is:

1. An in-vehicle power supply device configured to be mounted to a vehicle including an in-vehicle secondary battery and an in-vehicle load, the in-vehicle power supply device comprising:
   an input end configured to be connected to the in-vehicle secondary battery;
   an output end configured to be connected to the in-vehicle load;
   an external signal input port configured to receive an activation signal;
   a first converter unit connected to the input end and the output end; and
   a second converter unit connected in parallel to the first converter unit, wherein
   the first converter unit includes:
      a first drive power supply configured to constantly receive power suppled from the input end; and
      a first voltage converter operable in response to the power received by the first drive power supply so as to constantly output power from the output end, and
   the second converter unit includes:
      a second drive power supply activated by the activation signal received by the external signal input port;
      a converter controller configured to start to operate in response to the activating of the second drive power supply; and
      a second voltage converter configured to start to operate in response to the starting of the operating of the converter controller so as to output power from the output end.

2. The in-vehicle power supply device of claim 1, wherein a power capacity of the first converter unit is smaller than a power capacity of the second converter unit.

3. The in-vehicle power supply device of claim 1, wherein the second drive power supply includes a microcomputer configured to activate the second drive power supply in a boot mode in response to the activation signal received by the external signal input port.

4. The in-vehicle power supply device of claim 1, wherein
   the converter controller configured to detect an output current flowing through the output end, and
   the converter controller configured to control, based on the output current detected by the converter controller, the power output by the second voltage converter.

5. The in-vehicle power supply device of claim 4, wherein
   the activation signal is a vehicle start signal that starts the vehicle, or
   the activation signal is provided in synchronization with or in conjunction with the vehicle start signal.

6. The in-vehicle power supply device of claim 4, wherein the activation signal is issued in response to a predetermined operation performed by an occupant of the vehicle.

7. The in-vehicle power supply device of claim 4, wherein the activation signal is issued in response to an operation increasing the power output from the output end performed by an occupant of the vehicle after the vehicle is started.

* * * * *